United States Patent
Feng

(10) Patent No.: US 11,432,116 B2
(45) Date of Patent: Aug. 30, 2022

(54) METHOD AND DEVICE FOR TRANSMITTING DATA IN INTERNET OF VEHICLES SYSTEM

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP, LTD., Guangdong (CN)

( * ) Notice: Subject to any disclaimer, the term of this patent is extended or adjusted under 35 U.S.C. 154(b) by 15 days.

(21) Appl. No.: 15/771,364

(22) PCT Filed: Jan. 20, 2016

(86) PCT No.: PCT/CN2016/071493
§ 371 (c)(1),
(2) Date: Apr. 26, 2018

(87) PCT Pub. No.: WO2017/124333
PCT Pub. Date: Jul. 27, 2017

(65) Prior Publication Data
US 2018/0324564 A1   Nov. 8, 2018

(51) Int. Cl.
*H04W 4/40* (2018.01)
*H04W 48/08* (2009.01)
(Continued)

(52) U.S. Cl.
CPC ............. *H04W 4/40* (2018.02); *H04W 48/08* (2013.01); *H04W 48/18* (2013.01); *H04W 76/10* (2018.02); *H04W 76/15* (2018.02)

(58) Field of Classification Search
CPC ....... H04W 4/40; H04W 48/08; H04W 48/18; H04W 76/15; H04W 76/10
See application file for complete search history.

(56) References Cited

U.S. PATENT DOCUMENTS

2010/0067434 A1*  3/2010  Siu ................. H04W 48/18
                                                        370/328
2015/0171909 A1   6/2015  Gao
(Continued)

FOREIGN PATENT DOCUMENTS

CN         1659913 A       8/2005
CN       101790206 A       7/2010
(Continued)

OTHER PUBLICATIONS

International Search Report in international application No. PCT/CN2016/071493, dated Aug. 25, 2016.
(Continued)

*Primary Examiner* — Faruk Hamza
*Assistant Examiner* — Alan L Lindenbaum
(74) *Attorney, Agent, or Firm* — Ladas & Parry LLP

(57) ABSTRACT

Provided are a method and device for transmitting data in an Internet of Vehicles system. The method comprises: establishing, by a terminal device, a radio resource connection with a network device belonging to a found service cell, the network device being deployed by a first operator; receiving, by the terminal device, information of a second operator transmitted by the network device, the information of the second operator comprises at least one of identifier information and frequency resource information; receiving, by the terminal device, data transmitted by the first operator, and/or, receiving, by the terminal device, and according to the information of the second operator, data transmitted by the second operator. The invention realizes access by a terminal device, and ensures that the terminal device timely acquires information of other operators in a network, thereby enabling the terminal device to simultaneously transmit data to or receive data from multiple operator networks.

17 Claims, 4 Drawing Sheets

(51) Int. Cl.
  *H04W 48/18* (2009.01)
  *H04W 76/15* (2018.01)
  *H04W 76/10* (2018.01)

(56) References Cited

U.S. PATENT DOCUMENTS

| | | | |
|---|---|---|---|
| 2016/0135236 A1 | 5/2016 | Zhu | |
| 2017/0223669 A1* | 8/2017 | Ma | H04W 16/14 |
| 2018/0270696 A1* | 9/2018 | Duan | H04W 48/02 |

FOREIGN PATENT DOCUMENTS

| | | |
|---|---|---|
| CN | 102160424 A | 8/2011 |
| CN | 102340843 A | 2/2012 |
| CN | 102612148 A | 7/2012 |
| CN | 104363590 A | 2/2015 |
| CN | 104508996 A | 4/2015 |
| CN | 104717720 A | 6/2015 |
| EP | 2752072 A1 | 7/2014 |
| JP | 2010245888 A | 10/2010 |
| JP | 2017525320 A | 8/2017 |
| WO | 2008040391 A1 | 4/2008 |
| WO | 2013178177 A2 | 12/2013 |
| WO | 2016004903 A1 | 1/2016 |

OTHER PUBLICATIONS

English translation of the Written Opinion of the International Search Authority in the international application No. PCT/CN2016/071493, dated Aug. 25, 2016.
Supplementary European Search Report in the European application No. 16885606.0, dated Mar. 28, 2019.
NEC: "Deployment scenarios of LTE-based V2X" 3GPP Draft: R1-154194 V2X Deployment Scenarios. 3rd Generation Partnership Project (3GPP), Mobile Competence Centre;650, Route Des Lucioles : F-06921 Sophia-Antipolis Cedex Francevol. RAN WG1, No. Beijing; Aug. 24, 2015 2015082823 Aug. 2015 (Aug. 23, 2015), XP051039424, Retrieved from the Internet: URL:http://www.3gpp.org/ftp/Meetings 3GPP SYNC/RAN1/Docs/[retrieved on Aug. 23, 2015].
Huawei et al: "Further consideration of the Uu-based v2V Scenarios" 3GPP Draft: R2-156581 Further Consideration of the UU-Based V2V Scenarios. 3rd Generation Partnership Project (3GPP). Mobile Competence Centre650. Route Des Lucioles : F-06921 Sophia-Antipolis Cedevol. RAN WG2, No. Anaheim, USA; Nov. 16, 2015 2015112016 Nov. 2015 (Nov. 16, 2015), XP051005958,Retrieved from the Internet:URL:http://www.3gpp.org/ftp/Meetings 3GPPSYNC/RAN2/Docs/[retrieved on Nov. 16, 2015].
OPPO: "Discussion on SpectrumConfiguration for v2V"3GPP Draft; R2-164775-Discussion On Spectrum Configuration for V2V. 3rd Generation Partnership Project (3GPP) Mobile Competence Centre : 650, Route Des Lucioles: F-06921 Sophia-Antipolis Cedex : FRAvol. RAN WG2, No. Goteborg; Aug. 22, 2016 2016082612 Aug. 2016 (Aug. 12, 2016), XP051133627 Retrieved from the Internet: URL: http://www.3gpp.org/ftp/tsg ran/WG2_RL 2/TSGR2 95/Docs/[retrieved on Aug. 12, 2016].
First Office Action of the Chinese application No. 201680055116.2, dated Nov. 5, 2019.
First Office Action of the Japanese application No. 2018-519908, dated Sep. 20, 2019.
Huawei, HiSilicon, Remaining issues on Inter-carrier Discovery transmission[online], 3GPP TSG-RAN WG2#92 R2-156531, <URL:http://www.3gpp.org/ftp/tsg_ran/WG2_RL2/TSGR2_92/Docs/R2-156531 .zip>, Nov. 20, 2015.
Ericsson, V2X Scenarios[online], 3GPP TAG-RAN WG2#92 R2-156636, <URL:http://www.3gpp.org/ftp/tsg_ranWG2_RL2/TSGR2_92/Docs/R2-156636.zip>, Nov. 20, 2015.
3GPP TR 22.885, "Study on LTE Support for V2X Services" (Release 14), Dec. 2015, Whole document particularly p. 37, Fig. 5.19.2-1.
Written Opinion of the Singaporean application No. 11201803413Q, dated Oct. 9, 2019.
LG Electronics Inc., Email discussion—[91bis#36][LTE/V2X] Latency analysis, 3GPP TSG-RAN WG2 #92 draft R2-156505 Anaheim, CA, USA, Nov. 16-20, 2015.
Office Action of the Indian application No. 201817019116, dated Jun. 12, 2020.
Second Office Action of the Chinese application No. 201680055116.2, dated Dec. 25, 2019.
Third Office Action of the Chinese application No. 201680055116.2, dated Mar. 19, 2020.
First Office Action of the Japanese application No. 2020-076157, dated Sep. 3, 2021.
First Office Action of the Korean application No. 10-2018-7010834, dated Oct. 29, 2021.
Decision of Refusal of the Japanese application No. 2020-078157, dated Mar. 4, 2022.
Second Office Action of the Korean application No. 10-2018-7010834, dated Apr. 27, 2022.
First Office Action of the Chinese application No. 202010749581.4, dated May 31, 2022.

* cited by examiner

METHOD AND DEVICE FOR TRANSMITTING DATA IN INTERNET OF VEHICLES SYSTEM

RELATED APPLICATION

This application is an application under 35 U.S.C. 371 of International Application No. PCT/CN2016/071493 filed on Jan. 20, 2016, the entire contents of which are incorporated herein by reference.

TECHNICAL FIELD

Embodiments of the disclosure relate to communications, and more particularly to a method and device for transmitting data in a Vehicle-to-Everything (V2X) system.

BACKGROUND

In an existing Long Term Evolution (LTE) system, a mobile station may initiate a connection establishment process to a network side through a Radio Resource Control (RRC) connection request after completing uplink synchronization and uplink resource application through random access. At this moment, the mobile station may carry its own identification information (a System Architecture Evolution-Temporary Mobile Subscriber Identity (S-TMSI)) to identify itself to the network side for a network to recognize. Such an Identifier (ID) is allocated by a core network, and is formed by a Mobility Management Entity (MME) Code (mmec)+an MME-Temporary Mobile Subscriber Identity (m-TMSI). Herein, the mmec refers to information of the MME, and the m-TMSI refers to a unique ID of the mobile station. Meanwhile, the mobile station may report a selected Public Land Mobile Network (PLMN). After acquiring the S-TMSI of the mobile station, a base station device at the network side notifies the MME through S1 signaling to judge by the MME whether the mobile station is legal or not.

At present, the 3rd Generation Partnership Project (3GPP) is discussing introduction of V2X communication based on an LTE system, wherein access of a V2X terminal is a key problem in the whole communication flow. However, a future V2X communication system is not deployed by only one operator, and the V2X terminal is required to simultaneously access systems of multiple operators and transmit data to or receive data from networks of the multiple operators. Therefore, how to enable a V2X terminal to access a V2X network is a technical problem urgent to be solved.

SUMMARY

The disclosure provides a method and device for transmitting data in a V2X system, which may ensure that a V2X terminal successfully accesses a communication network and may also ensure that terminal device timely knows about information of another operator in the network to enable the terminal device to simultaneously transmit data to networks of multiple operators or receive data from the networks of the multiple operators.

A first aspect provides a method for transmitting data in a V2X system. According to the method, a terminal device establishes a radio resource connection with network equipment containing a found serving cell, the network equipment being deployed by a first operator; the terminal device receives information of a second operator from the network equipment, the information of the second operator including at least one of identification information or frequency resource information; and the terminal device receives data transmitted by the first operator, and/or, the terminal device receives data transmitted by the second operator according to the information of the second operator.

Optionally, the information of the second operator is transmitted to the terminal device by the network equipment when information indicating that the terminal device passes authentication and verification is received from core network equipment.

Therefore, according to the method for transmitting data in the V2X system in the embodiments of the disclosure, access of the terminal device may be implemented, and meanwhile, it may be ensured that the terminal device timely knows about information of another operator in a network to enable the terminal device to simultaneously transmit data to networks of multiple operators or receive data from the networks of the multiple operators.

In combination with the first aspect, in a first possible implementation mode of the first aspect, a communication network to which the serving cell belongs may be deployed by the first operator and the second operator.

In combination with the first aspect and the abovementioned implementation mode, in a second possible implementation mode of the first aspect, the operation that the terminal device establishes the radio resource connection with the network equipment containing the found serving cell may include that: the terminal device transmits at least one of the following information to the network equipment: identity information of the terminal device, connection establishment cause information or terminal type information.

Herein, the identity information of the terminal device may be configured for the core network equipment to authenticate the terminal device, the connection establishment cause information may be configured to indicate a cause for establishment of the radio resource connection, and the terminal type information may be configured to identify a type of the terminal device.

In combination with the second possible implementation mode of the first aspect, in a third possible implementation mode of the first aspect, the operation that the terminal device transmits at least one of the following information to the terminal device: the identity information of the terminal device, the connection establishment cause information or the terminal type information may include that: the terminal device transmits a connection establishment request message to the network equipment, the connection establishment request message including at least one of the following information: the identity information of the terminal device, the connection establishment cause information or the terminal type information; or, the terminal device transmits a connection establishment completion message to the network equipment, the connection establishment completion message including at least one of the following information: the identity information of the terminal device, the connection establishment cause information or the terminal type information.

In combination with the first aspect and the abovementioned implementation modes, in a fourth possible implementation mode of the first aspect, the method may further include that: the terminal device transmits request information for an operator to the network equipment, the request information being configured to request the network equipment to transmit the information of the second operator to the terminal device.

The terminal device, when not storing the information of another operator of the network to be accessed to which the serving cell belongs, may request a network side via a corresponding ID to notify the terminal device of information of the another operator of the serving cell.

In combination with the first aspect and the abovementioned implementation modes, in a fifth possible implementation mode of the first aspect, the operation that the terminal device receives the information of the second operator from the network equipment may include that: the terminal device receives a reconfiguration message transmitted by the network equipment, the reconfiguration message including the information of the second operator.

A second aspect provides a method for transmitting data in a V2X system. According to the method, network equipment establishes a radio resource connection with a terminal device, the network equipment being a network equipment containing a serving cell for the terminal device and the network equipment being deployed by a first operator; the network equipment transmits identity information of the terminal device to core network equipment for the core network equipment to authenticate and verify the terminal device according to the identity information of the terminal device; and the network equipment transmits information of a second operator to the terminal device when receiving information indicating successful authentication and verification from the core network equipment, the information of the second operator including at least one of identification information or frequency resource information.

Therefore, according to the method for transmitting data in the V2X system in the embodiments of the disclosure, access of the terminal device may be implemented, and meanwhile, it may be ensured that the terminal device timely knows about information of another operator in a network to enable the terminal device to simultaneously transmit data to networks of multiple operators or receive data from the networks of the multiple operators.

In combination with the second aspect, in a first possible implementation mode of the second aspect, a communication network to which the serving cell belongs may be deployed by the first operator and the second operator.

In combination with the second aspect or the abovementioned implementation mode, in a second possible implementation mode of the second aspect, the operation that the network equipment establishes the radio resource connection with the terminal device may include that: the network equipment receives at least one of the following information transmitted by the terminal device: identity information of the terminal device, connection establishment cause information or terminal type information, wherein the connection establishment cause information may be configured to indicate a cause for establishment of the radio resource connection, and the terminal type information may be configured to identify a type of the terminal device.

In combination with the second possible implementation mode of the second aspect, in a third possible implementation mode of the second aspect, the operation that the network equipment transmits the identity information of the terminal device to the core network equipment when the network equipment receives the identity information of the terminal device and the terminal type information from the terminal device may include that: the network equipment forwards the received identity information of the terminal device and terminal type information to the core network equipment.

In combination with the second aspect or the abovementioned implementation modes, in a fourth possible implementation mode of the second aspect, the method may further include that: the network equipment determines the type of the terminal device according to a type of a frequency resource occupied when the radio resource connection is established with the terminal device; and the network equipment transmits the identification information identifying the type of the terminal device to the core network equipment.

In combination with the second possible implementation mode of the second aspect, in a fifth possible implementation mode of the second aspect, the operation that the network equipment receives at least one of the following information transmitted by the terminal device: the identity information of the terminal device, the connection establishment cause information or the terminal type information may include that: the terminal device receives a connection establishment request message transmitted by the terminal device, the connection establishment request message including at least one of the following information: the identity information of the terminal device, the connection establishment cause information or the terminal type information; or, the network equipment receives a connection establishment completion message transmitted by the terminal device, the connection establishment completion message including at least one of the following information: the identity information of the terminal device, the connection establishment cause information or the terminal type information.

In combination with the second aspect and the abovementioned possible implementation modes, in a sixth possible implementation mode of the second aspect, the operation that the information of the second operator is transmitted to the terminal device may include that: when request information for an operator transmitted by the terminal device is received, the information of the second operator is transmitted to the terminal device.

In combination with the second aspect and the abovementioned possible implementation modes, in a seventh possible implementation mode of the second aspect, the method may further include that: the network equipment receives the information of the second operator from the core network equipment.

A third aspect provides a method for transmitting data in a V2X system. According to the method, core network equipment receives identity information of a terminal device from network equipment, the network equipment being network equipment containing a serving cell for the terminal device and the network equipment being deployed by a first operator; the core network equipment authenticates and verifies the terminal device according to the identity information of the terminal device; and when the terminal device passes authentication and verification, the core network equipment transmits information indicating successful authentication and verification to the network equipment for the network equipment to transmit information of a second operator to the terminal device when receiving the information indicating the successful authentication and verification, the information of the second operator including at least one of identification information or frequency resource information.

Therefore, according to the method for transmitting data in the V2X system in the embodiments of the disclosure, access of the terminal device may be implemented, and meanwhile, it may be ensured that the terminal device timely knows about information of another operator in a network to enable the terminal device to simultaneously transmit data to networks of multiple operators or receive data from the networks of the multiple operators.

In combination with the third aspect, in a first possible implementation mode of the third aspect, the method may further include that: the core network equipment transmits the information of the second operator to the network equipment.

In combination with the third aspect and the abovementioned implementation mode, in a second possible implementation mode of the third aspect, a communication network to which the serving cell belongs may be deployed by the first operator and the second operator.

A fourth aspect provides a terminal device configured to execute the method in the first aspect or any possible implementation mode of the first aspect, specifically including units configured to execute the method in the first aspect or any possible implementation mode of the first aspect.

A fifth aspect provides network equipment configured to execute the method in the second aspect or any possible implementation mode of the second aspect, specifically including units configured to execute the method in the second aspect or any possible implementation mode of the second aspect.

A sixth aspect provides core network equipment configured to execute the method in the third aspect or any possible implementation mode of the third aspect, specifically including units configured to execute the method in the third aspect or any possible implementation mode of the third aspect.

A seventh aspect provides a computer-readable medium configured to store a computer program, the computer program including instructions configured to execute the method in the first aspect or any possible implementation mode of the first aspect.

An eighth aspect provides a computer-readable medium configured to store a computer program, the computer program including instructions configured to execute the method in the second aspect or any possible implementation mode of the second aspect.

A ninth aspect provides a computer-readable medium configured to store a computer program, the computer program including instructions configured to execute the method in the third aspect or any possible implementation mode of the third aspect.

BRIEF DESCRIPTION OF DRAWINGS

In order to describe the technical solutions of the embodiments of the disclosure more clearly, the drawings required to be used in the embodiments of the disclosure will be simply introduced below. Obviously, the drawings described below are only some embodiments of the disclosure. Other drawings may further be obtained by those skilled in the art according to these drawings without creative work.

DETAILED DESCRIPTION

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those skilled in the art based on the embodiments in the disclosure without creative work shall fall within the scope of protection of the disclosure.

In the embodiments of the disclosure, network equipment may be a base station, and may also be a Road Side Unit (RSU) capable of scheduling a V2X terminal device, and optionally, the RSU may be a device such as an intelligent traffic light and a traffic sign.

A method for transmitting data in a V2X system in the embodiments of the disclosure is mainly applied to a process of establishing a connection between a vehicle and a network by a vehicle-mounted terminal when the vehicle is started in the V2X system, which is a preparation stage for transmitting data. The method for transmitting data in the embodiments of the disclosure may be applied to a V2X system deployed by one or more operators. When the V2X system is deployed by multiple operators, possible deployment manners may be, but not limited to, the following manners: the multiple operators completely share a dedicated frequency band to deploy the V2X system; the multiple operators use frequencies in the dedicated frequency band for transmission, but frequency resources are independently allocated to each other; or the multiple operators still use their own existing frequency bands for transmission, and no dedicated frequency band resources are allocated.

Figure 1:
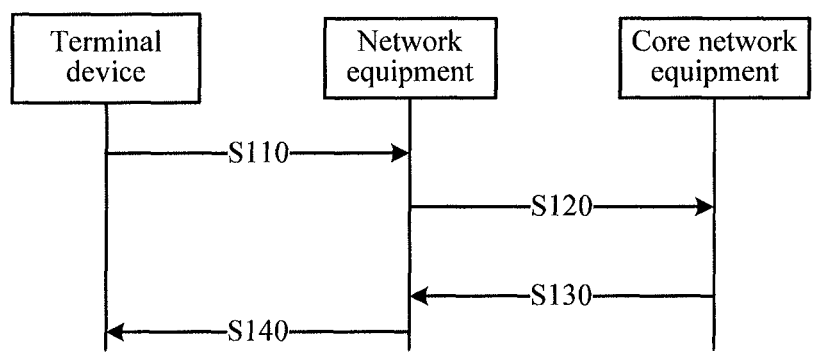
FIG. 1 is a schematic flowchart of a method for transmitting data in a V2X system according to an embodiment of the disclosure.

FIG. 1 is a schematic flowchart of a method for transmitting data in a V2X system according to an embodiment of the disclosure. As shown in FIG. 1, the method 100 includes the following operations.

In S110, a terminal device establishes a radio resource connection with network equipment containing a found serving cell, the network equipment being deployed by a first operator.

The terminal device may select one serving cell in serving cells to access, namely establishing the radio resource connection with the network equipment, after being started. Optionally, the terminal device may transmit at least one of the following information to the network equipment in a process of establishing the radio resource connection with the network equipment: identity information of the terminal device, connection establishment cause information or terminal type information. The identity information of the terminal device is configured for core network equipment to authenticate the terminal device, the connection establishment cause information is configured to indicate a cause for establishment of the radio resource connection, and the terminal type information is configured to identify a type of the terminal device.

For example, the terminal device may transmit a connection establishment request message and/or a connection establishment completion message to the network equipment, and the connection establishment request message and/or the connection establishment completion message may contain at least one of the abovementioned information. The connection establishment request message may be an RRC connection establishment request message, and the connection establishment completion message may be an RRC connection establishment completion message.

In S120, the network equipment transmits identity information of the terminal device to the core network equipment for the core network equipment to authenticate and verify the terminal device according to the identity information of the terminal device.

Optionally, as an example, the identity information of the terminal device may be, for example, a Mobile Subscriber Identity (MSI) or a TMSI. The terminal device may add an ID identifying its own type in the connection establishment request message or the connection establishment completion message. For example, the ID may directly identify the terminal device to be a V2X type terminal device or further identify the terminal device to be a car, a truck or the like.

Furthermore, the network equipment may determine the type of the terminal device according to a type of a frequency resource occupied when the radio resource connection is established with the terminal device. For example, if a V2X system dedicated frequency is used when the network equipment establishes the radio resource connection with the terminal device, the network equipment determines that the terminal device is a V2X terminal device. The network equipment may forward the terminal type information to the core network equipment when receiving the terminal type information transmitted by the terminal device, or the network equipment may transmit the identification information indicating the type of the terminal device to the core network equipment when deducing the type of the terminal device through an access frequency. For example, the network equipment may transmit the identification information identifying the type of the terminal device to the core network equipment through an S1 interface message, for example, an initial User Equipment (UE) message.

In S130, the network equipment receives information indicating successful authentication from the core network equipment.

The core network equipment performs authentication and verification based on information, for example, a registration PLMN ID and an ID of the terminal device, forwarded by the network equipment and reported by the terminal device to verify whether the terminal device is an authorized V2X terminal device or not.

After successful authentication, the core network equipment may confirm that the terminal device is an authorized V2X terminal device through an S1 interface message, for example, an INITIAL CONTEXT SETUP REQUEST.

In S140, the network equipment transmits information of a second operator to the terminal device, the information of the second operator including at least one of identification information or frequency resource information.

The network equipment may transmit the information of the second operator to the terminal device after receiving a message indicating a successful authentication from the core network equipment. For example, the information may be transmitted to the terminal device through air interface dedicated signaling such as a reconfiguration message. Other configuration information of the network equipment, for example, a bearer establishment related physical-layer configuration, a Media Access Control (MAC)-layer configuration or the like, is also transmitted at the same time. The second operator may be an operator deploying a communication network which is for the terminal device in S110 and to which the serving cell belongs, that is, the communication network which is for the terminal device and to which the serving cell belongs is deployed by both the first operator and the second operator.

Optionally, identification information of the operators may be PLMN numbers of the operators. When the PLMN numbers of the operators form a one-to-one correspondence with frequency resources, only the PLMN number of the second operator may be transmitted to the terminal device or only frequency resource information of the second operator may be transmitted to the terminal device.

Furthermore, the network equipment may transmit the information of the second operator to the terminal device only when receiving, from the terminal device, a request made for the network equipment, of transmitting the information of the second operator to the terminal device.

Optionally, in S130, the core network equipment may contain the information of the second operator in the information, transmitted to the network equipment, indicating that the terminal device is an authorized V2X terminal device. The network equipment forwards the received information, transmitted by the core network equipment, of the second operator to the terminal device, or the network equipment may transmit, to the terminal device, the information of the second operator, which is configured through Operation Administration and Maintenance (OAM) or monitored.

Figure 2:
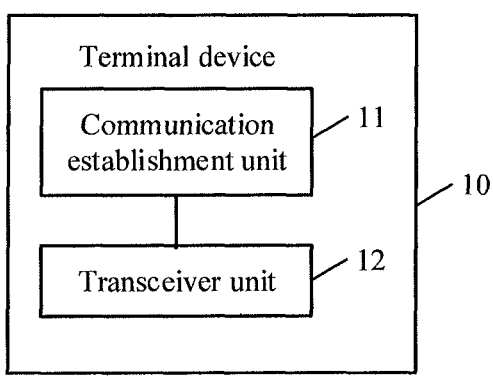
FIG. 2 is a schematic block diagram of a terminal device according to an embodiment of the disclosure.

A terminal device according to an embodiment of the disclosure will be described below in combination with FIG. 2 in detail. As shown in FIG. 2, the terminal device 10 includes a communication establishment unit 11 and a transceiver unit 12.

The communication establishment unit 11 is configured to establish a radio resource connection with network equipment containing a found serving cell, the network equipment being deployed by a first operator.

The transceiver unit 12 is configured to receive information of a second operator from the network equipment, the information of the second operator including at least one of identification information or frequency resource information.

The transceiver unit 12 is further configured to receive data transmitted by the first operator, and/or, receive data transmitted by the second operator according to the information of the second operator.

The terminal device of the embodiment of the disclosure establishes the radio resource connection with the network equipment, and receives information of another operator from the network equipment, so that data may be simultaneously transmitted to networks of multiple operators or data of the networks of multiple operators may be simultaneously received.

In the embodiment of the disclosure, optionally a communication network to which the serving cell belongs is deployed by the first operator and the second operator.

In the embodiment of the disclosure, optionally, the transceiver unit 12 is specifically configured to transmit at least one of the following information to the network equipment: identity information of the terminal device, connection establishment cause information or terminal type information.

The identity information of the terminal device is configured for the core network equipment to authenticate the terminal device, the connection establishment cause information is configured to indicate a cause for establishment of the radio resource connection, and the terminal type information is configured to identify a type of the terminal device.

In the embodiment of the disclosure, optionally, the transceiver unit 12 is specifically configured to transmit a connection establishment request message to the network equipment, the connection establishment request message including at least one of the following information: the identity information of the terminal device, the connection establishment cause information or the terminal type information; or, to transmit a connection establishment completion message to the network equipment, the connection establishment completion message including at least one of the following information: the identity information of the terminal device, the connection establishment cause information or the terminal type information.

In the embodiment of the disclosure, optionally, the transceiver unit 12 is further configured to transmit request information for an operator to the network equipment, the request information being configured to request the network equipment to transmit the information of the second operator to the terminal device.

In the embodiment of the disclosure, optionally, the transceiver unit 12 is further configured to receive a reconfiguration message transmitted by the network equipment, the reconfiguration message including the information of the second operator.

Figure 3:
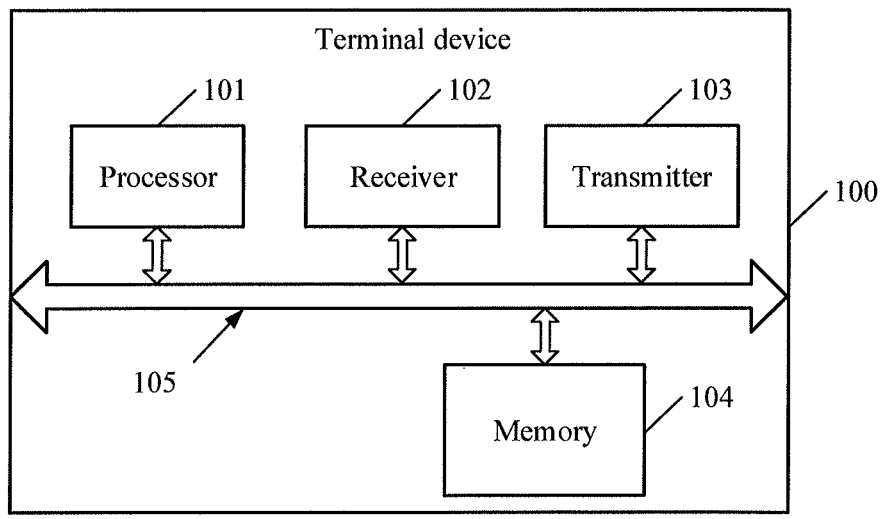
FIG. 3 is a schematic block diagram of a terminal device according to another embodiment of the disclosure.

It is noted that, in the embodiment of the disclosure, the communication establishment unit 11 may be implemented by a processor, and the transceiver unit 12 may be implemented by a receiver and a transmitter. As shown in FIG. 3, the terminal device 100 may include a processor 101, a receiver 102, a transmitter 103 and a memory 104. The memory 104 may be configured to store one or more codes executed by the processor 101 or the like, and the processor 101 is configured to execute the one or more codes stored by the memory 104 to control the receiver 102 to receive a signal and control the transmitter 103 to transmit a signal.

Each component in the terminal device 100 is coupled together through a bus system 105. The bus system 105 includes a data bus, and further includes a power bus, a control bus and a state signal bus.

The terminal device 10 shown in FIG. 2 and the terminal device 100 shown in FIG. 3 may implement each process implemented by the terminal device in the method embodiments shown in FIG. 1, which will not be elaborated herein for avoiding repetitions.

Figure 4:
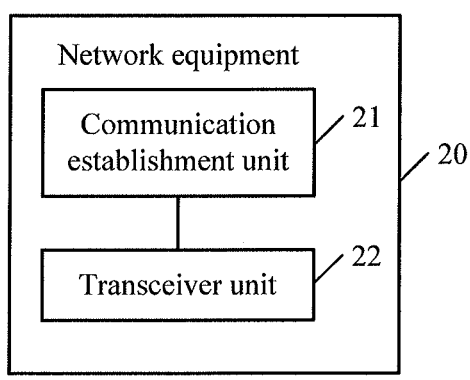
FIG. 4 is a schematic block diagram of network equipment according to an embodiment of the disclosure.

FIG. 4 is a schematic block diagram of network equipment according to an embodiment of the disclosure. As shown in FIG. 4, the network equipment 20 includes a communication establishment unit 21 and a transceiver unit 22.

The communication establishment unit 21 is configured to establish a radio resource connection with a terminal device, the network equipment being network equipment containing a serving cell for the terminal device and the network equipment being deployed by a first operator.

The transceiver unit 22 is configured to transmit identity information of the terminal device to core network equipment for the core network equipment to authenticate and verify the terminal device according to the identity information of the terminal device.

The transceiver unit 22 is further configured to transmit information of a second operator to the terminal device when receiving information indicating successful authentication and verification from the core network equipment, the information of the second operator including at least one of identification information or frequency resource information.

The network equipment of the embodiment of the disclosure establishes the radio resource connection with the terminal device, and transmits information of another operator to the terminal device, so that the terminal device may simultaneously transmit data to networks of multiple operators or receive data from the networks of multiple operators.

In the embodiment of the disclosure, optionally, a communication network to which the serving cell belongs is deployed by the first operator and the second operator.

In the embodiment of the disclosure, optionally, the transceiver unit 22 is further configured to receive at least one of the following information transmitted by the terminal device: identity information of the terminal device, connection establishment cause information or terminal type information. The connection establishment cause information is configured to indicate a cause for establishment of the radio resource connection, and the terminal type information is configured to identify a type of the terminal device.

In the embodiment of the disclosure, optionally, when the transceiver unit 22 receives the identity information of the terminal device and the terminal type information from the terminal device, the transceiver unit 22 is specifically configured to forward the received identity information of the terminal device and terminal type information to the core network equipment.

In the embodiment of the disclosure, optionally, the communication establishment unit 21 is further configured to determine the type of the terminal device according to a type of a frequency resource occupied when the radio resource connection is established with the terminal device. The transceiver unit 22 is further configured to transmit the identification information identifying the type of the terminal device to the core network equipment.

In the embodiment of the disclosure, optionally, the transceiver unit 22 is specifically configured to receive a connection establishment request message transmitted by the terminal device, the connection establishment request message including at least one of the following information: the identity information of the terminal device, the connection establishment cause information or the terminal type information; or, receive a connection establishment completion message transmitted by the terminal device, the connection establishment completion message including at least one of the following information: the identity information of the terminal device, the connection establishment cause information or the terminal type information.

In the embodiment of the disclosure, optionally, the transceiver unit 22 is specifically configured to transmit the information of the second operator to the terminal device, when request information for an operator transmitted by the terminal device is received.

In the embodiment of the disclosure, optionally, the transceiver unit 22 is further configured to receive the information of the second operator from the core network equipment.

Figure 5:
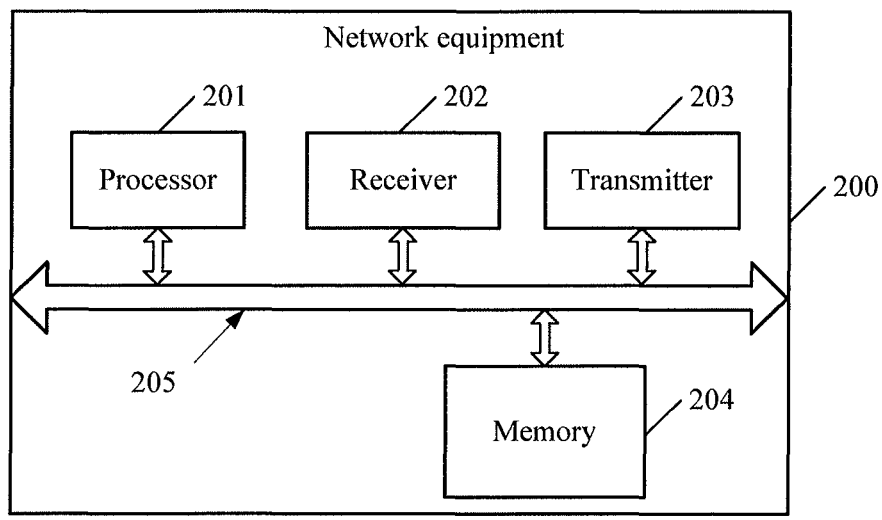
FIG. 5 is a schematic block diagram of network equipment according to another embodiment of the disclosure.

It is noted that, in the embodiment of the disclosure, the communication establishment unit 21 may be implemented by a processor, and the transceiver unit 22 may be implemented by a receiver and a transmitter. As shown in FIG. 5, network equipment 200 may include a processor 201, a receiver 202, a transmitter 203 and a memory 204. The memory 204 may be configured to store one or more codes executed by the processor 201 or the like, and the processor 201 is configured to execute the one or more codes stored by the memory 204 to control the receiver 202 to receive a signal and control the transmitter 203 to transmit a signal.

Each component in the network equipment 200 is coupled together through a bus system 205. The bus system 205 includes a data bus, and further includes a power bus, a control bus and a state signal bus.

The network equipment 20 shown in FIG. 4 and the network equipment 200 shown in FIG. 5 may implement each process implemented by the network equipment in the method embodiments shown in FIG. 1, which will not be elaborated herein for avoiding repetitions.

Figure 6:
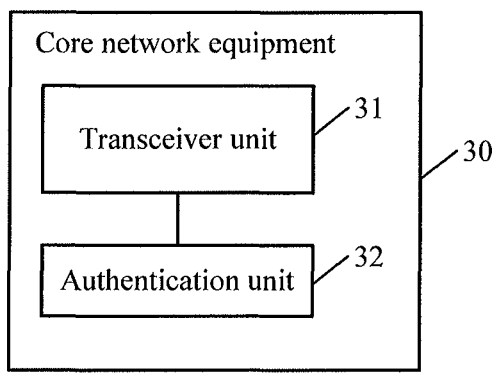
FIG. 6 is a schematic block diagram of core network equipment according to an embodiment of the disclosure.

FIG. 6 illustrates core network equipment according to an embodiment of the disclosure. As shown in FIG. 6, the core network equipment 30 includes a transceiver unit 31 and an authentication unit 32.

The transceiver unit 31 is configured to receive identity information of terminal device from network equipment, the network equipment being network equipment containing a serving cell for the terminal device and the network equipment being deployed by a first operator.

The authentication unit 32 is configured to authenticate and verify the terminal device according to the identity information of the terminal device.

The transceiver unit 31 is further configured to, when the terminal device passes authentication and verification of the authentication unit, transmit information indicating successful authentication and verification to the network equipment for the network equipment to transmit information of a second operator to the terminal device when receiving the information indicating the successful authentication and verification, the information of the second operator including at least one of identification information or frequency resource information.

When the terminal device passes authentication, the core network equipment of the embodiment of the disclosure transmits the information indicating the successful authentication to the network equipment for the network equipment to transmit information of another operator to the terminal device when receiving the information, so that the terminal device may simultaneously transmit data to networks of multiple operators or receive data from the networks of the multiple operators.

In the embodiment of the disclosure, optionally, the transceiver unit 31 is further configured to transmit the information of the second operator to the network equipment.

In the embodiment of the disclosure, optionally, a communication network to which the serving cell belongs is deployed by the first operator and the second operator.

Figure 7:
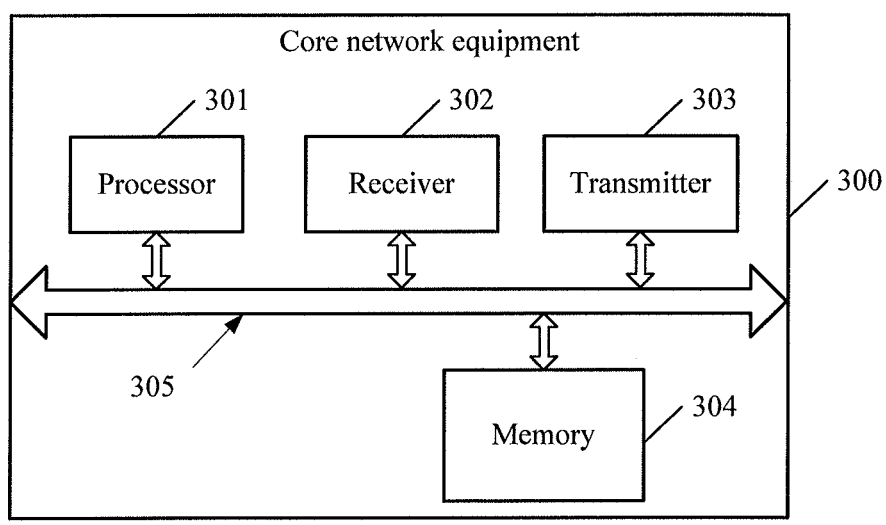
FIG. 7 is a schematic block diagram of core network equipment according to an embodiment of the disclosure.

It is noted that, in the embodiment of the disclosure, the transceiver unit 31 may be implemented by a receiver and a transmitter, and the authentication unit 32 may be implemented by a processor. As shown in FIG. 7, core network equipment 300 may include a processor 301, a receiver 302, a transmitter 303 and a memory 304. The memory 304 may be configured to store one or more codes executed by the processor 301 or the like, and the processor 301 is configured to execute the one or more codes stored by the memory 304 to control the receiver 302 to receive a signal and control the transmitter 303 to transmit a signal.

Each component in the core network equipment 300 is coupled together through a bus system 305. The bus system 305 includes a data bus, and further includes a power bus, a control bus and a state signal bus.

The core network equipment 30 shown in FIG. 6 and the core network equipment 300 shown in FIG. 7 may implement each process implemented by the network equipment in the method embodiments shown in FIG. 1, which will not be elaborated herein for avoiding repetitions.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art may realize the described functions for each specific application by virtue of different methods, but such realization shall fall within the scope of the disclosure.

Those skilled in the art may clearly know that specific working processes of the system, device and unit described above may refer to the corresponding processes in the method embodiments for convenient and brief description and will not be elaborated herein.

In some embodiments provided by the application, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a conventional art or part of the technical solutions may be embodied in form of software product, and the computer software product is stored in a storage medium, including a plurality of instructions configured to enable a piece of computer device (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting data in a Vehicle-to-Everything (V2X) system, comprising:

establishing, by a terminal device, a radio resource connection with network equipment covering a serving cell, the network equipment being deployed by a first operator, and a wireless communication network to which the serving cell belongs being deployed by the first operator and a second operator;

receiving, by the terminal device, information of the second operator transmitted by the network equipment in a case that the network equipment receives information indicating successful authentication and verification from core network equipment, wherein the information of the second operator is carried in the information indicating successful authentication and verification, and the information of the second operator comprising at least one of a Public Land Mobile Network (PLMN) number or frequency resource information;

establishing, by the terminal device, access to the wireless communication network of the second operator according to the information of the second operator; and receiving, by the terminal device, data transmitted by the second operator according to the information of the second operator;

wherein information of the first operator is a PLMN number, and in a case that PLMN number of the first operator and PLMN number of the second operator form a one-to-one correspondence with frequency resources, and only when the terminal device transmits request information for the second operator to the network equipment, the request information being configured to request the network equipment to transmit the information of the second operator to the terminal device, the frequency resource information of the second operator is transmitted to the terminal device.

2. The method according to claim 1, wherein establishing, by the terminal device, the radio resource connection with the network equipment covering the serving cell comprises:

transmitting, by the terminal device, at least one of the following information to the network equipment: identity information of the terminal device, connection establishment cause information or terminal type information, wherein the identity information of the terminal device is configured for core network equipment to authenticate the terminal device, the connection establishment cause information is configured to indicate a cause for establishment of the radio resource connection, and the terminal type information is configured to identify a type of the terminal device.

3. The method according to claim 2, wherein transmitting, by the terminal device, at least one of the following information to the network equipment: the identity information of the terminal device, the connection establishment cause information or the terminal type information comprises:

transmitting, by the terminal device, a connection establishment request message to the network equipment, the connection establishment request message comprising at least one of the following information: the identity information of the terminal device, the connection establishment cause information or the terminal type information; or, transmitting, by the terminal device, a connection establishment completion message to the network equipment, the connection establishment completion message comprising at least one of the following information: the identity information of the terminal device, the connection establishment cause information or the terminal type information.

4. The method according to claim 1, wherein receiving, by the terminal device, the information of the second operator transmitted by the network equipment comprises:

receiving, by the terminal device, a reconfiguration message transmitted by the network equipment, the reconfiguration message comprising the information of the second operator.

5. The method according to claim 1, wherein the PLMN number of the first operator and the PLMN number of the second operator form a one-to-one correspondence with same frequency resources.

6. The method according to claim 1, further comprising:

receiving, by the terminal device, data of the first operator when the terminal device receives the data transmitted by the second operator according to the information of the second operator.

7. A method for transmitting data in a Vehicle-to-Everything (V2X) system, comprising:

establishing, by network equipment, a radio resource connection with a terminal device, the network equipment being network equipment covering a serving cell for the terminal device and the network equipment being deployed by a first operator, and a wireless communication network to which the serving cell belongs being deployed by the first operator and a second operator;

transmitting, by the network equipment, identity information of the terminal device to core network equipment for the core network equipment to authenticate and verify the terminal device according to the identity information of the terminal device;

receiving, by the network equipment, information of the second operator from the core network equipment, wherein the information of the second operator is carried in information indicating successful authentication and verification; and transmitting, by the network equipment, information of the second operator to the terminal device in a case that the information indicating successful authentication and verification is received from the core network equipment for the terminal device to establish access to the wireless communication network of the second operator, the information of the second operator comprising at least one of a Public Land Mobile Network (PLMN) number or frequency resource information;

wherein information of the first operator is a PLMN number, and in a case that PLMN number of the first operator and PLMN number of the second operator form a one-to-one correspondence with frequency resources, and only when the terminal device transmits request information for the second operator to the network equipment, the request information being configured to request the network equipment to transmit the information of the second operator to the terminal device, the frequency resource information of the second operator is transmitted to the terminal device.

8. The method according to claim 7, wherein establishing, by the network equipment, the radio resource connection with the terminal device comprises:

receiving, by the network equipment, at least one of the following information transmitted by the terminal device: identity information of the terminal device, connection establishment cause information or terminal type information, wherein the connection establishment cause information is configured to indicate a cause for establishment of the radio resource connection, and the terminal type information is configured to identify a type of the terminal device.

9. The method according to claim 8, wherein transmitting, by the network equipment, the identity information of the terminal device to the core network equipment when the network equipment receives the identity information of the terminal device and the terminal type information from the terminal device comprises:
   forwarding, by the network equipment, the received identity information of the terminal device and terminal type information to the core network equipment.

10. The method according to claim 7, further comprising:
    determining, by the network equipment, a type of the terminal device according to a type of a frequency resource occupied when the network equipment establishes the radio resource connection with the terminal device; and
    transmitting, by the network equipment, identification information identifying the type of the terminal device to the core network equipment.

11. The method according to claim 8, wherein receiving, by the network equipment, at least one of the following information transmitted by the terminal device: the identity information of the terminal device, the connection establishment cause information or the terminal type information comprises:
    receiving, by the network equipment, a connection establishment request message transmitted by the terminal device, the connection establishment request message comprising at least one of the following information: the identity information of the terminal device, the connection establishment cause information or the terminal type information; or,
    receiving, by the network equipment, a connection establishment completion message transmitted by the terminal device, the connection establishment completion message comprising at least one of the following information: the identity information of the terminal device, the connection establishment cause information or the terminal type information.

12. Network equipment, comprising:
    a processor, configured to establish a radio resource connection with a terminal device, the network equipment being network equipment covering a serving cell for the terminal device and the network equipment being deployed by a first operator, and a wireless communication network to which the serving cell belongs being deployed by the first operator and a second operator;
    a transmitter, configured to:
       transmit identity information of the terminal device to core network equipment for the core network equipment to authenticate and verify the terminal device according to the identity information of the terminal device; and
       transmit information of the second operator to the terminal device in a case that information indicating successful authentication and verification is received from the core network equipment for the terminal device to establish access to the wireless communication network of the second operator, the information of the second operator comprising at least one of a Public Land Mobile Network (PLMN) number or frequency resource information; and
    a receiver, configured to:
       receive the information of the second operator from the core network equipment, wherein the information of the second operator is carried in the information indicating successful authentication and verification;
    wherein information of the first operator is a PLMN number, and in a case that PLMN number of the first operator and PLMN number of the second operator form a one-to-one correspondence with frequency resources, and
    only when the terminal device transmits request information for the second operator to the network equipment, the request information being configured to request the network equipment to transmit the information of the second operator to the terminal device, the frequency resource information of the second operator is transmitted to the terminal device.

13. The network equipment according to claim 12, wherein the receiver is further configured to:
    receive at least one of the following information transmitted by the terminal device: identity information of the terminal device, connection establishment cause information or terminal type information, wherein the connection establishment cause information is configured to indicate a cause for establishment of the radio resource connection, and the terminal type information is configured to identify a type of the terminal device.

14. The network equipment according to claim 13, wherein the receiver is further configured to:
    receive a connection establishment request message transmitted by the terminal device, the connection establishment request message comprising at least one of the following information: the identity information of the terminal device, the connection establishment cause information or the terminal type information; or,
    receive a connection establishment completion message transmitted by the terminal device, the connection establishment completion message comprising at least one of the following information: the identity information of the terminal device, the connection establishment cause information or the terminal type information.

15. The network equipment according to claim 12, wherein
    the processor is further configured to: determine a type of the terminal device according to a type of a frequency resource occupied when the network equipment establishes the radio resource connection with the terminal device; and
    the transmitter is further configured to: transmit identification information identifying the type of the terminal device to the core network equipment.

16. The network equipment according to claim 12, wherein transmitting, by the network equipment, information of the second operator to the terminal device comprises:
    transmitting, by the network equipment, a reconfiguration message to the terminal device, the reconfiguration message comprising the information of the second operator.

17. The network equipment according to claim 12, wherein the PLMN number of the first operator and the PLMN number of the second operator form a one-to-one correspondence with same frequency resources.

* * * * *